(12) United States Patent
Higuchi et al.

(10) Patent No.: US 8,463,203 B2
(45) Date of Patent: Jun. 11, 2013

(54) BASE STATION APPARATUS, USER APPARATUS AND COMMUNICATION CONTROL METHOD

(75) Inventors: Kenichi Higuchi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 858 days.

(21) Appl. No.: 12/526,729

(22) PCT Filed: Feb. 8, 2008

(86) PCT No.: PCT/JP2008/052137
§ 371 (c)(1),
(2), (4) Date: Nov. 10, 2009

(87) PCT Pub. No.: WO2008/099780
PCT Pub. Date: Aug. 21, 2008

(65) Prior Publication Data
US 2010/0056074 A1    Mar. 4, 2010

(30) Foreign Application Priority Data
Feb. 14, 2007   (JP) ................... 2007-034133

(51) Int. Cl.
*H03C 7/02*   (2006.01)
(52) U.S. Cl.
USPC ............ 455/101; 455/562; 342/372; 342/373
(58) Field of Classification Search
USPC ........................................ 455/101
See application file for complete search history.

(56) References Cited

U.S. PATENT DOCUMENTS

| | | | |
|---|---|---|---|
| 6,496,157 B1 * | 12/2002 | Mottier | 343/853 |
| 6,600,934 B1 | 7/2003 | Yun et al. | |
| 2007/0018895 A1 * | 1/2007 | Bolin | 343/702 |

FOREIGN PATENT DOCUMENTS

| | | | |
|---|---|---|---|
| JP | 01-196928 A | 8/1989 | |
| JP | 7-162350 A | 6/1995 | |
| JP | 11-252614 A | 9/1999 | |
| JP | 2003-304216 A | 10/2003 | |
| JP | 2004-320528 A | 11/2004 | |
| JP | 2006-067237 A | 3/2006 | |
| JP | 2006-279450 A | 10/2006 | |
| RU | 2193279 C2 | 11/2002 | |
| WO | 2006/104029 A1 | 10/2006 | |

OTHER PUBLICATIONS

Russian Office Action for Application No. 2009133104/07, mailed on Jul. 19, 2011 (9 pages).
esp@cenet Patent Abstract for Russian Publication No. 2193279, publication date Nov. 20, 2002. (1 page).
Japanese Office Action for Application No. 2007-034133, mailed on Feb. 22, 2011 (6 pages).
Patent Abstracts of Japan for Japanese Publication No. 2006-067237, publication date Mar. 9, 2006 (1 page).

(Continued)

*Primary Examiner* — Ajibola Akinyemi
(74) *Attorney, Agent, or Firm* — Osha Liang LLP

(57) ABSTRACT

A base station apparatus in a radio communication system where transmit diversity is applied in uplinks includes a reference signal measurement unit configured to measure a receive level of the reference signal, a switch pitch determination unit configured to determine the antenna switch pitch of transmitting the reference signal based on the receive level measured by the reference signal measurement unit, and a transmitting unit configured to transmit the antenna switch pitch determined by the switch pitch determination unit.

9 Claims, 12 Drawing Sheets

OTHER PUBLICATIONS

3GPP TSG RAN WG1 Meeting #47bis, R1-070097, "Performance Evaluation of Closed Loop-Based Antenna Switching Transmit Diversity in E-UTRA Uplink," Sorrento, Italy, Jan. 15-19, 2007, 7 pages.
Patent Abstracts of Japan, Publication No. 01-196928, dated Aug. 8, 1989, 1 page.
Patent Abstracts of Japan, Publication No. 2006-279450, dated Oct. 12, 2006, 1 page.
Patent Abstracts of Japan, Publication No. 2004-320528, dated Nov. 11, 2004, 1 page.
Patent Abstracts of Japan, Publication No. 07-162350, dated Jun. 23, 1995, 1 page.
3GPP TR 25.814 V7.1.0, Sep. 2006, "Physical layer aspects for evolved Universal Terrestrial Radio Access (UTRA)," 132 pages.
International Search Report issued in PCT/JP2008/052137, mailed on May 13, 2008, with translation, 5 pages.
Written Opinion issued in PCT/JP2008/052137, mailed on May 13, 2008, 4 pages.
Japanese Office Action for Application No. 2007-034133, mailed on Jun. 21, 2011 (5 pages).
Patent Abstracts of Japan for Japanese Publication No. 2003-304216, publication date Oct. 24, 2003 (1 page).
Office Action in Japanese Patent Application No. 2007-034133 mailed Nov. 24, 2010, with partial English translation thereof (5 pages).
3GPP RAN1#47, R1-063089, "Low Cost Training for Transmit Antenna Selection on the Uplink", Mitsubishi Electric, NTT DoCoMo, Nov. 10, 2006 (8 pages).
Japanese Office Action issued in Japanese Application No. 2010-194603, mailed Aug. 7, 2012, and English translation thereof, 4 pages.
Patent Abstracts of Japan, Publication No. 11-252614 published on Sep. 17, 1999, 1 page.

* cited by examiner

FIG.8

| FADING PITCH [SUBFRAME] | SWITCH PITCH OF ANTENNAS FOR TRANSMITTING SOUNDING REFERENCE SIGNALS [SUBFRAME] |
|---|---|
| ~2 | OFF |
| ~4 | 1 |
| ~6 | 2 |
| ⋮ | ⋮ |

| RECEIVE STRENGTH OF REFERENCE SIGNAL | SWITCH PITCH OF ANTENNAS FOR TRANSMITTING SOUNDING REFERENCE SIGNALS [SUBFRAME] |
|---|---|
| LOW | 1 |
| MEDIUM | 2 |
| HIGH | 4 |

BASE STATION APPARATUS, USER APPARATUS AND COMMUNICATION CONTROL METHOD

TECHNICAL FIELD

The present invention relates to the technical field of LTE (Long Term Evolution) systems, and more particularly relates to base station apparatuses, user apparatuses and communication control methods.

BACKGROUND ART

A communication scheme serving as a successor of W-CDMA and HSDPA, that is, a LTE system has been and is being discussed by a W-CDMA standardization organization 3GPP. In the LTE system, an OFDM (Orthogonal Frequency Division Multiplexing) scheme and a SC-FDMA (Single-Carrier Frequency Division Multiple Access) scheme are being investigated as downlink and uplink radio access schemes, respectively. See 3GPP TR 25.814 (V7.1.0), "Physical Layer Aspects for Evolved UTRA", September 2006, for example.

In the OFDM scheme, a frequency band is segmented into multiple smaller frequency bands (subcarriers), and data is carried and transmitted over the individual frequency bands. According to the OFDM scheme, the subcarriers are densely arranged on the frequency band in such a manner that the subcarriers are partially overlapped with each other without mutual interference, resulting in fast transmission and highly efficient utilization of the frequency band.

In the SC-FDMA scheme, a frequency band is segmented, and different frequency bands are used among multiple terminals for transmission, resulting in reduced interference among the terminals. According to the SC-FDMA scheme, variations in transmit power are reduced, resulting in lower power consumption for the terminals and wider coverage.

Also, application of transmit diversity to the LTE system is being discussed. The transmit diversity may be advantageous to improved throughput and wider coverage for user equipment (UE) or a user apparatus having a high capacity and located at a cell boundary.

In the LTE system, however, the user equipment is not required to include two RF circuits. For the transmit diversity for uplinks, that is, from the user equipment to a base station apparatus, thus, some technique of implementing the transmit diversity by means of a single RF circuit is required.

For example, according to TSTD (Time Switched Transmit Diversity), two transmit antennas are switched between each other upon the lapse of a predefined time period for alternate uplink transmissions from the transmit antennas. The TSTD may be advantageous to channels to which no scheduling is applied, for example, to RACH (Random Access Channel).

In addition, a CL-ASTD (Closed Loop-based Antenna Switching Transmit Diversity) scheme for determining which antenna is to be used for transmission based on feedback is known. The CL-ASTS scheme is advantageous to channels where scheduling is applied. In the CL-ASTD scheme, a base station apparatus (eNB: eNodeB) measures a receive quality, such as CQI, of reference signals transmitted from antennas, selects an antenna to be used for transmissions based on the measured receive quality of reference signals, and feeds the selection to a user apparatus in an antenna selection command. See 3GPP R1-070097, "Performance Evaluation of Closed Loop-Based ANTENNA Switching Transmit Diversity in E-UTRA Uplinks", January 2007 for example.

DISCLOSURE OF INVENTION

Problem to be Solved by the Invention

On the other hand, the above-mentioned background art may have problems as follows.

The above-mentioned CL-ASTD scheme is concept-based, and no specific arrangement of the base station apparatus and the user apparatus has been proposed.

If the CL-ASTD scheme is applied, transmissions from two transmit antennas have to be switched under control of a single RF circuit. Also, a user apparatus has to periodically transmit pilot signals for measuring CQI from transmit antennas alternately for CL-ASTD switching depending on the CQI. Specifically, the user apparatus has to use resources assigned thereto to transmit sounding reference signals in the first subframe, for example, independently of application of the transmit diversity. For example, an antenna for transmitting the sounding reference signals is determined corresponding to an antenna assigned for data transmissions.

As one example, an exemplary case where antenna #1 is selected for data transmission in a user apparatus including two antennas #1, #2 is described with reference to FIG. 1. In such a user apparatus, for example, a reference signal (sounding reference signal) is transmitted for each subframe, and the antennas for transmitting the reference signals are switched at a predefined pitch. For example, the antennas for transmitting the reference signals may be switched once in four subframes. In other words, the sounding reference signals are transmitted from an antenna assigned for data transmissions in three of the four subframes but from an antenna not assigned for data transmissions in the remaining one subframe.

The sounding reference signals are used for frequency scheduling in the antenna selected for data transmissions. Thus, when the number of transmissions of the sounding reference signals from the antenna selected for data transmissions is reduced, the accuracy of the scheduling will become lower. On the other hand, when the number of transmissions of the sounding reference signals from the antenna #2 not selected for data transmissions is reduced, the number of antenna switches will be reduced. In particular, communication quality becomes lower in cases of short fading pitches and frequent antenna switches.

For example, if the fading pitch is relatively short as illustrated in FIG. 2, the antennas are frequently switched to one with a better receive quality. In time period (1), antenna #1 has a better receive quality. In time period (2), antenna #2 has a better receive quality. In time period (3), antenna #1 has a better receive quality. In time period (4), antenna #2 has a better receive quality. In this case, when the number of transmissions of sounding reference signals from antenna #2 not selected for data transmissions is reduced, the data transmission will be made from the selected antenna #1 even in a time period with a poor receive quality, which is not desirable.

On the other hand, if the fading pitch is relatively long as illustrated in FIG. 3, an antenna with a better receive quality is infrequently switched. In time period (1), antenna #1 has a better receive quality, and in time period (2), antenna #2 has a better receive quality. In this case, even if the number of transmissions of sounding reference signals from antenna #2 not selected for data transmissions is reduced, variations of the receive quality is relatively small, and the number of switches of the antennas for data transmission will be reduced, which may not cause significant problems.

The present invention addresses the above-mentioned conventional problems. One object of the present invention is to provide a base station apparatus, a user apparatus and a communication control method that can properly control antenna switch pitches of transmitting reference signals in a mobile communication system where transmit diversity is applied.

Means for Solving the Problem

In order to overcome the above problems, one aspect of the present invention relates to a base station apparatus in a radio communication system where transmit diversity is applied in uplinks, wherein a user apparatus including multiple antennas switches among the antennas in accordance with an antenna switch pitch transmitted from the base station apparatus and transmits a reference signal in an uplink, the base station apparatus comprising: a reference signal measurement unit configured to measure a receive level of the reference signal; a switch pitch determination unit configured to determine the antenna switch pitch of transmitting the reference signal based on the receive level measured by the reference signal measurement unit; and a transmitting unit configured to transmit the antenna switch pitch determined by the switch pitch determination unit.

According to this aspect, the antenna switch pitch of transmitting reference signals can be determined and transmitted based on the receive level of the reference signals transmitted from the user apparatus.

A further aspect of the present invention relates to a user apparatus in a radio communication system where transmit diversity is applied in uplinks, wherein an antenna switch pitch of transmitting a reference signal is determined in a base station apparatus based on a receive level of the reference signal transmitted in an uplink and is transmitted to the user apparatus, the user apparatus comprising: multiple antennas; and an antenna switch unit configured to switch among the antennas to transmit the reference signal based on the antenna switch pitch.

According to this aspect, transmit diversity by switching among the antennas transmitting reference signals can be applied in accordance with the antenna switch pitch of transmitting reference signals as determined in the base station apparatus.

A still further aspect of the present invention relates to a communication control method in a radio communication system where transmit diversity is applied in an uplink, the method comprising: a user apparatus switching among multiple antennas in accordance with an antenna switch pitch transmitted from a base station apparatus and transmitting a reference signal; the base station apparatus measuring a receive level of the reference signal; the base station apparatus determining an antenna switch pitch of transmitting a reference signal based on the measured receive level; and the base station apparatus transmitting the determined antenna switch pitch to the user apparatus.

According to this aspect, the antenna switch pitch of transmitting reference signals can be determined and transmitted based on the receive level of the reference signals transmitted from the user apparatus.

Advantage of the Invention

According to the embodiments of the present invention, it is possible to provide a base station apparatus, a user apparatus and a communication control method that can properly control antenna switch pitches of transmitting reference signals in a mobile communication system where transmit diversity is applied.

BRIEF DESCRIPTION OF DRAWINGS

FIG. 8 illustrates an exemplary table for specifying relationship between fading pitches and switch pitches of antennas for transmitting sounding reference signals.

LIST OF REFERENCE SYMBOLS

Figure 1:
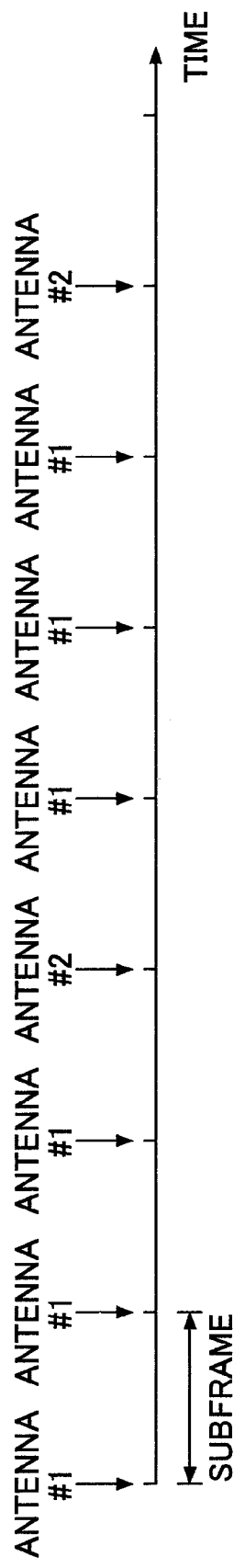
FIG. 1 schematically illustrates a CL-ASTD scheme.
Figure 2:
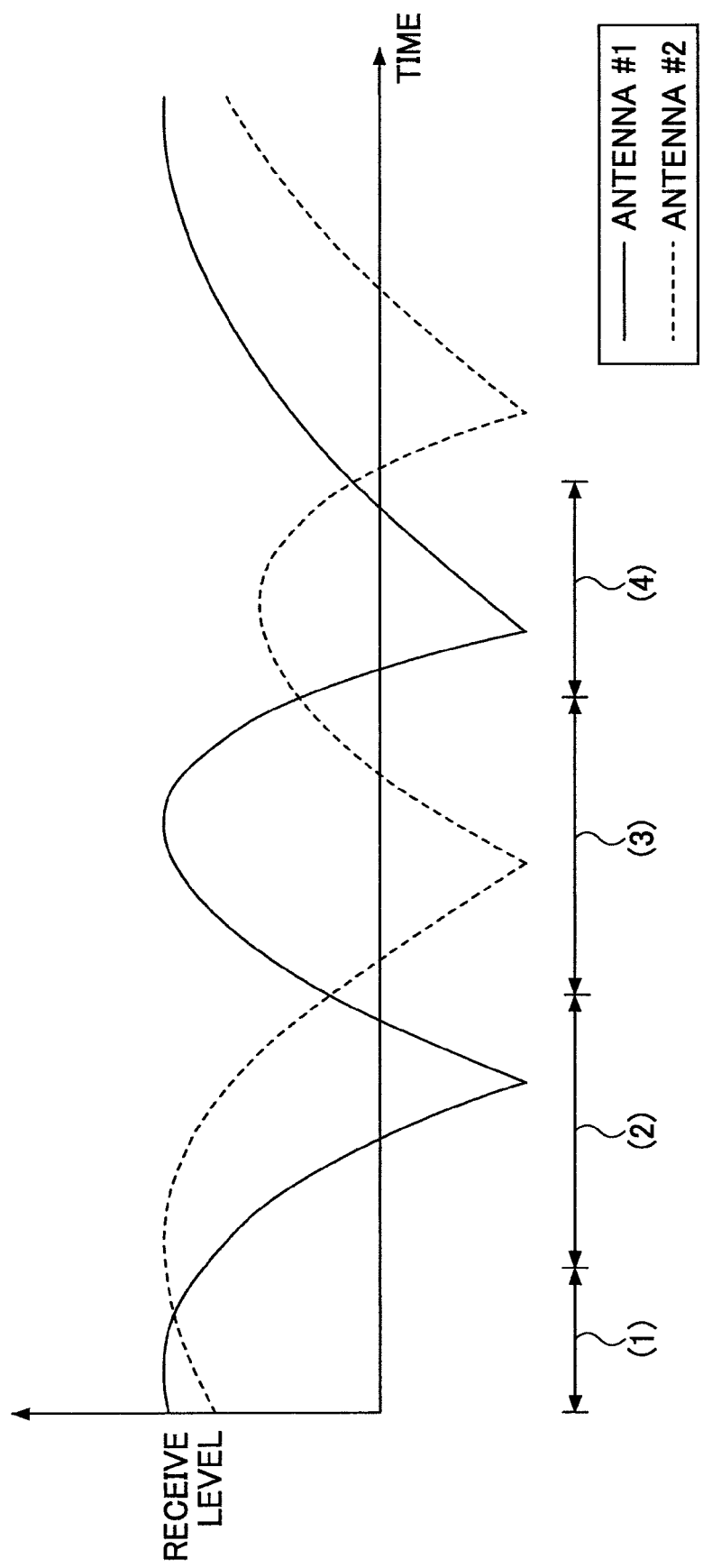
FIG. 2 schematically illustrates exemplary variations of fading.
Figure 3:
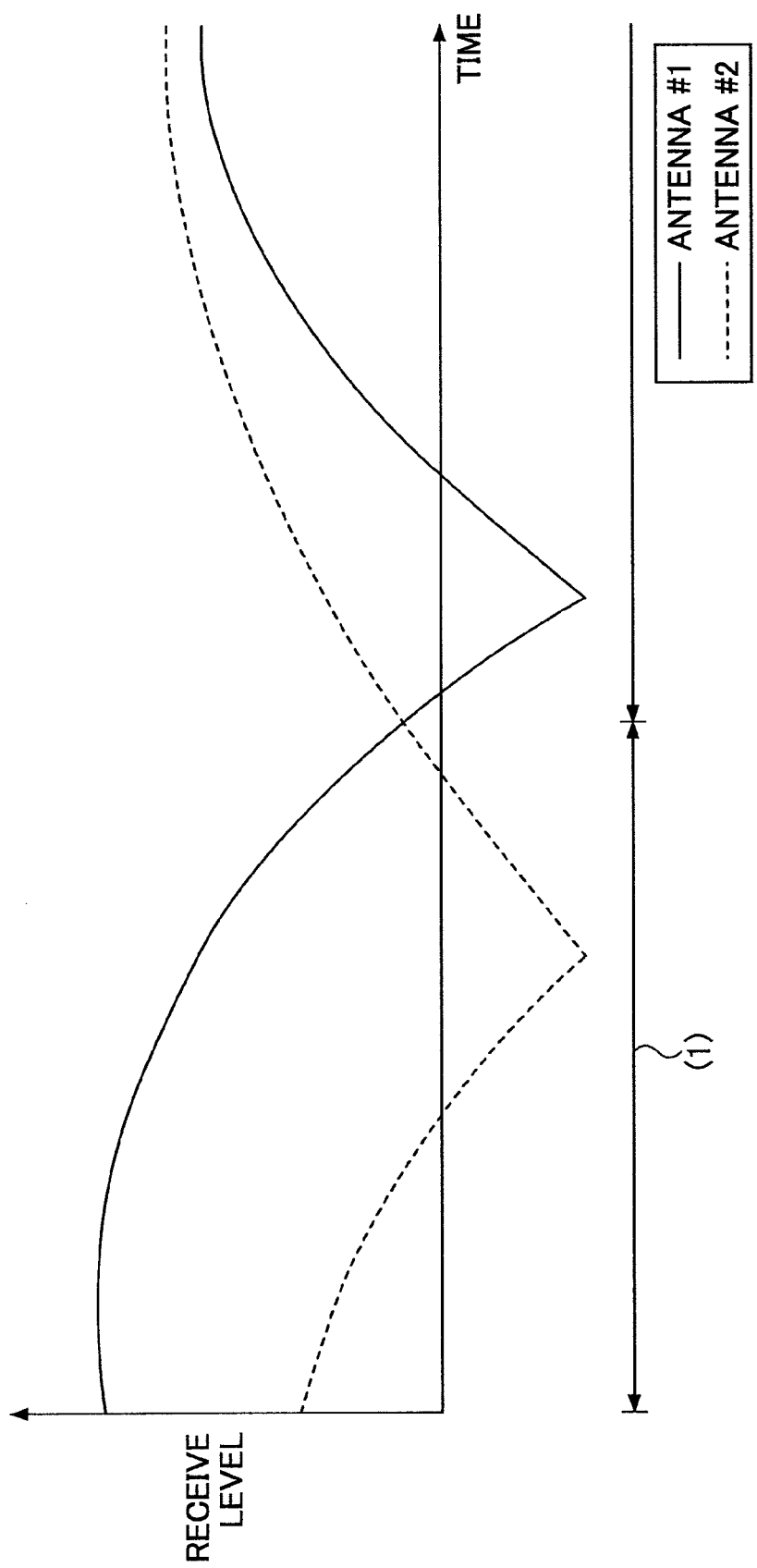
FIG. 3 schematically illustrates exemplary variations of fading.

50: cell
$100_1$, $100_2$, $100_3$, $100_n$: user apparatus or equipment
102: SC-FDMA modulation unit
104: RF transmitter circuit
106: power amplifier (PA)
108: transmit antenna switch unit
110, 112: antenna
200: base station apparatus
202: transmit and receive antenna
204: transmitting and receiving unit
206: receiving RF unit
208: reference signal measurement unit
210: transmit antenna switch pitch determination unit
212: storage unit
214: transmitting RF unit
300: access gateway apparatus
400: core network
1000: radio communication system

BEST MODE FOR CARRYING OUT THE INVENTION

The best mode for carrying out the present invention is described in connection with embodiments below with reference to the accompanying drawings.

The same symbols are used for the same functions throughout all the drawings for describing the embodiments, and duplicated descriptions are omitted.

A radio communication system to which a base station apparatus according to embodiments of the present invention is applied is described with reference to FIG. 4.

A radio communication system 1000 is a system to which Evolved UTRA and UTRAN (which may be also referred to as LTE (Long Term Evolution) or Super 3G) may be applied. The radio communication system includes a base station apparatus (eNB: eNode B) 200 and multiple user apparatuses (UE: User Equipment) $100_n$ ($100_1$, $100_2$, $100_3$, . . . , $100_n$ where n is a positive integer). The base station apparatus 200 is connected to an upper station such as an access gateway apparatus 300, and the access gateway apparatus 300 is connected to a core network 400. In this embodiment, the user apparatuses $100_n$ communicate to the base station apparatus 200 in a cell 50 in accordance with Evolved UTRA and UTRAN.

In this embodiment, the user apparatuses $100_n$ ($100_1$, $100_2$, $100_3$, . . . , $100_n$) have the same arrangement, function and state, and unless specifically stated otherwise, the embodiment is described in connection with the user apparatus $100_n$.

The radio communication system 1000 uses the OFDM scheme for downlinks and the SC-FDMA scheme for uplinks. As mentioned above, the OFDM scheme is a scheme where a frequency band is segmented into smaller frequency bands (subcarriers) and data is transferred over the individual frequency bands. The SC-FDMA is a scheme where a frequency band is segmented and segmented different frequency bands are used among multiple terminals for transmission, resulting in reduction in interference among the terminals.

Communication channels in the LTE are described below.

For downlinks, a PDSCH (Physical Downlink Shared Channel) shared among the user apparatuses $100_n$ and a LTE downlink control channel are used. In the downlinks, the LTE downlink control channel is used to transmit information on users or transport formats mapped into the PDSCH, information on users or transport formats mapped into a PUSCH (Physical Uplink Shared Channel), acknowledgement information for the PUSCH or others while the PDSCH is used to transmit user data.

For uplinks, the PUSCH shared among the user apparatuses $100_n$ and a LTE uplink control channel are used. The uplink control channel includes two types of channels, a channel time multiplexed with the PUSCH and a channel frequency multiplexed with the PUSCH.

In the uplinks, the LTE uplink control channel is used to transmit downlink quality information (CQI: Channel Quality Indicator) used for scheduling of the PDSCH, AMC (Adaptive Modulation and Coding) and TPC (Transmit Power Control) and acknowledgement information for the PDSCH (HARQ ACK information). Also, the PUSCH is used to transmit user data.

Figure 5:
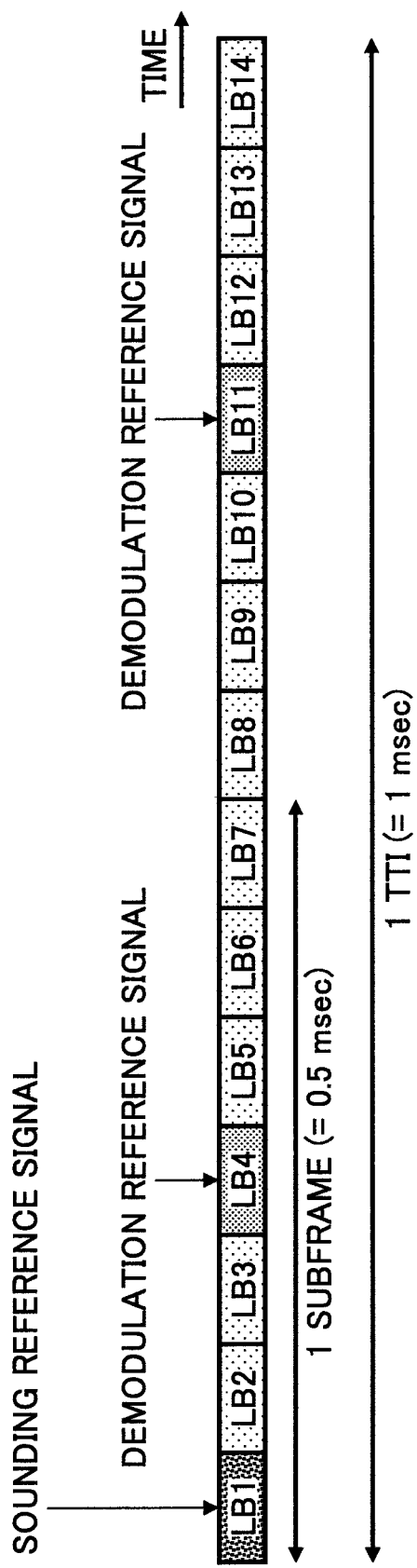
FIG. 5 schematically illustrates exemplary subframes and a TTI according to one embodiment of the present invention.

For uplink transmissions, it is being discussed to use seven long blocks (LBs) for each subframe serving as a time slot. Also, one TTI (Transmit Time Interval) consists of two subframes. Thus, one TTI consists of 14 long blocks as illustrated in FIG. 5. Demodulation reference signals are mapped into two of the 14 long blocks. Also, Sounding reference signals used to determine a transmit format for the PUSCH such as scheduling, uplink AMC and TPC are transmitted in one of the 14 long blocks other than the long blocks mapped into the demodulation reference signals.

In the long block for transmitting the sounding reference signals, the sounding reference signal from multiple user apparatuses are multiplexed in accordance with a CDM (Code Division Multiplexing) scheme. The demodulation reference signals may be mapped into the fourth and eleventh long blocks in one TTI, for example. Also, the sounding reference signals may be mapped into the first long block in the single TTI, for example.

Figure 6:
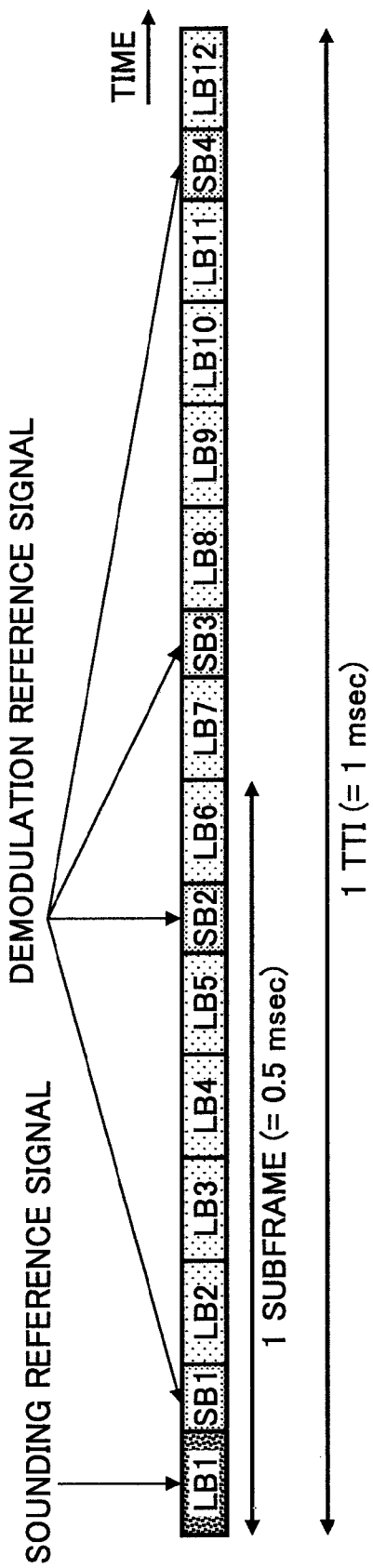
FIG. 6 schematically illustrates exemplary subframes and a TTI according to one embodiment of the present invention.

Alternatively, it is being discussed to use two short blocks (SBs) and six long blocks (LBs) for each subframe as an uplink transmit format. Then, one TTI consists of two subframes. Thus, the single TTI consists of four short blocks and 12 long blocks as illustrated in FIG. 6. Sounding reference signal are mapped into one of the 12 long blocks. In the long block for transmitting the sounding reference signals, the sounding reference signals from multiple user apparatuses are multiplexed in accordance with the CDM scheme.

The four short blocks are used to transmit demodulation reference signals. For example, the demodulation reference signals may be mapped into the four short blocks within the single TTI. Also, for example, the sounding reference signals may be mapped into the first long block within the single TTI.

In the uplinks, each user apparatus $100_n$ transmits data on a per-RB (Resource Block) basis with respect to the frequency direction and on a per-TTI basis with respect to the time direction. In the LTE system, one RB corresponds to 180 kHz.

Also in the uplinks, each user apparatus loon transmits sounding reference signals over multiple RBs.

Next, a base station apparatus 200 according to one embodiment of the present invention is described with reference to FIG. 7.

The base station apparatus 200 adjusts a switch pitch depending on migration speed of the user apparatus $100_n$. In this embodiment, a fading pitch is used as an indicator of the migration speed of the user apparatus $100_n$, but any other appropriate indicator may be used. As the migration speed of the user apparatus $100_n$ is higher, fading fluctuation is larger and the fading pitch is smaller. Thus, antennas must be selected at a shorter pitch.

Also, in this embodiment, if the user apparatus $100_n$ moves so fast that the base station apparatus 200 cannot follow the user apparatus $100_n$ in closed loop control, an extremely large antenna selection pitch is applied, or the CL-ASTD scheme is stopped. According to this arrangement, it is possible to prevent unnecessary transmissions of reference signals.

In this embodiment, the base station apparatus 200 includes a transmit and receive antenna 202, a transmitting and receiving unit 204, a receiving RF unit 206, a reference signal measurement unit 208, a transmit antenna switch pitch determination unit 210, a storage unit 212 and a transmitting RF unit 214.

Sounding reference signals transmitted from the user apparatus $100_n$ in uplinks are received at the receiving RF unit 206 via the transmit and receive antenna 202 and the transmitting and receiving unit 204.

Receiving operations on the sounding reference signals are performed in the receiving RF unit 206, and the resulting signals are supplied to the reference signal measurement unit 208.

The reference signal measurement unit 208 measures a receive level based on the received sounding reference signals, for example, and determines a fading pitch. The fading pitch may be determined based on the number of times of the receive level of the sounding reference signals exceeding a predefined threshold. For example, if the predefined threshold is equal to zero, the number of zero crossing times may be derived. The reference signal measurement unit 208 supplies the determined fading pitch to the transmit antenna switch pitch determination unit 210.

Based on the incoming fading pitch, the transmit antenna switch pitch determination unit 210 determines a switch pitch of switching among antennas for transmitting reference signals with reference to a table indicative of correspondence between the fading pitches stored in the storage unit 212 and the transmit antenna switch pitches for transmitting the sounding reference signals. The transmit antenna switch pitch determination unit 210 supplies the determined transmit antenna switch pitch for the reference signals to the transmitting RF unit 214. The transmitting RF unit 214 transmits the incoming transmit antenna switch pitch via the transmitting and receiving unit 204. For example, the transmitting RF unit 214 may use a downlink channel, such as a L1/L2 downlink control channel or a dedicated control channel, to transmit the transmit antenna switch pitch to the user apparatus $100_n$.

As illustrated in FIG. 8, the storage unit 212 stores the table indicative of the correspondence between the fading pitches and the transmit antenna switch pitches for transmitting sounding reference signals. This table is generated to have shorter transmit intervals for higher migration speeds, that is, for shorter fading pitches.

Also, when the migration speed becomes higher than a predefined value, for example, a speed of disabling the base station apparatus to follow the user apparatus $100_n$ in accordance with the closed loop control, the switch pitch of switching antennas to transmit sounding reference signals is made longer. Alternatively, the ASTD may be stopped. For example, when the fading pitch becomes less than a fading pitch corresponding to the migration speed of disabling the base station apparatus to follow the user apparatus $100_n$ in accordance with the closed loop control, for example, when the fading pitch becomes less than two subframes, the switch pitch of switching antennas to transmit sounding reference signals is made longer or the ASTD is stopped.

Next, a user apparatus 100 according to one embodiment of the present invention is described with reference to FIG. 9.

In this embodiment, the user apparatus 100 includes a SC-FDMA modulation unit 102, a RF transmitter circuit 104, a power amplifier (PA) 106, a transmit antenna switch unit 108 and antennas 110, 112. A switch pitch (reference signal switch pitch) of switching the antennas to transmit reference signals transmitted from the base station apparatus 200 is supplied to the transmit antenna switch unit 108.

Base-banded sounding reference signals are supplied to the SC-FDMA modulation unit 102 for modulation in accordance with the SC-FDMA scheme. Then, the resulting signals are supplied to the RF transmitter circuit 104.

The RF transmitter circuit 104 converts the modulated sounding reference signals into RF signals corresponding to a predefined uplink transmit frequency. The converted RF signals are amplified in the PA 106.

The amplified signals are transmitted via antennas switched by the transmit antenna switch unit 108 based on the reference signal switch pitch transmitted from the base station apparatus 200.

Figure 10:
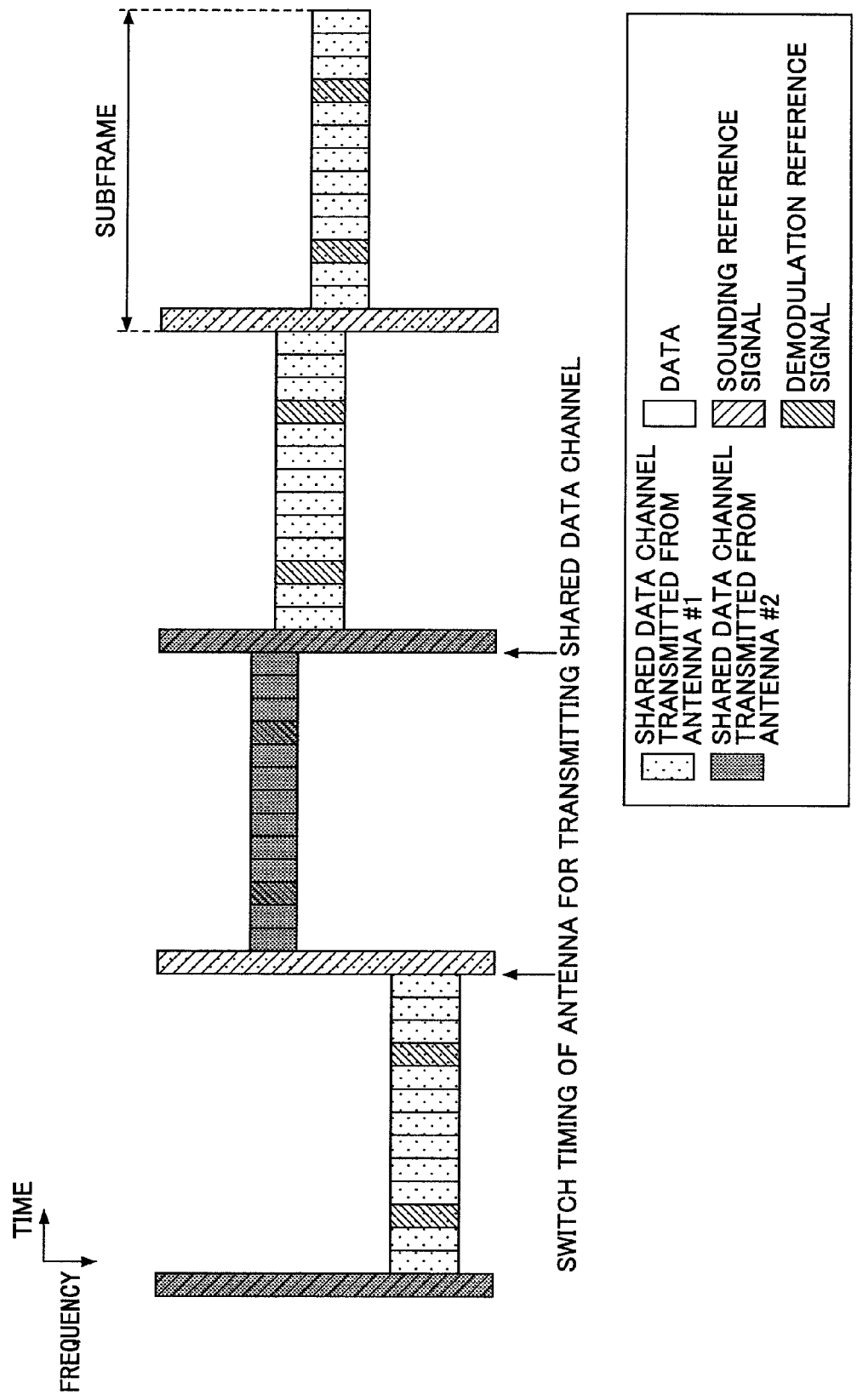
FIG. 10 schematically illustrates an exemplary transmission scheme of reference signals according to one embodiment of the present invention.

For example, as illustrated in FIG. 10, reference signals may be transmitted from the antennas alternately in accordance with the reference signal switch pitch transmitted from the base station apparatus 200 regardless of which of the antennas is selected to transmit shared data channels. In the illustration in FIG. 10, the antennas for transmitting sounding reference signals are alternated per one subframe.

Specifically, the transmit antenna switch unit 108 determines whether to transmit sounding reference signals from an antenna assigned for data transmissions based on the remainder when the subframe number is divided by the reference signal switch pitch.

For example, assuming that it is indicated that the reference signal switch pitch is equal to 4 (subframes), if the remainder is equal to any of 0, 1 and 2, it is determined to transmit sounding reference signals from an antenna assigned for data transmission, and on the other hand, if the remainder is equal to 3, it is determined to transmit the sounding reference signals from an antenna not assigned for data transmission.

In this case, the sounding reference signals are transmitted from the antenna assigned for data transmission in subframes #1, #2. In subframe #3, the sounding reference signals are transmitted from the antenna not assigned for data transmissions, and in subframe #4, the sounding reference signals are transmitted from the antenna assigned for data transmissions. For example, if antenna #1 is assigned for data transmission and antenna #2 is assigned for data transmissions in subframe #3, the sounding reference signals are transmitted in subframe #4 from antenna #2 assigned for data transmissions.

In this manner, if a transmitter and a receiver, that is, the base station apparatus 200 and the user apparatus, both know only the transmit antenna switch pattern for transmitting the reference signals, that is, reference signal transmit antenna switch pitch, no additional transmit control information is required.

Next, an exemplary operation of the base station apparatus 200 in the radio communication system 1000 according to this embodiment is described with reference to FIG. 11. At step S1102, the reference signal measurement unit 208 measures a receive level, such as CQI, of a reference signal (sounding reference signal) transmitted from the user apparatus $100_n$.

At step S1104, the reference signal measurement unit 208 determines a fading pitch based on the measured receive level of the sounding reference signal. For example, the reference signal measurement unit 208 counts the number of times when the receive level exceeds a predefined threshold during a predefined observation time period so as to determine the fading pitch.

At step S1106, the transmit antenna switch pitch determination unit 210 determines a switch pitch of switching antennas to transmit reference signals based on the fading pitch.

At step S1108, the transmit antenna switch pitch determination unit 210 transmits the determined transmit antenna switch pitch to the user apparatus $100_n$ via the transmitting RF unit 214.

Next, a radio communication system according to another embodiment of the present invention is described.

Figure 4:
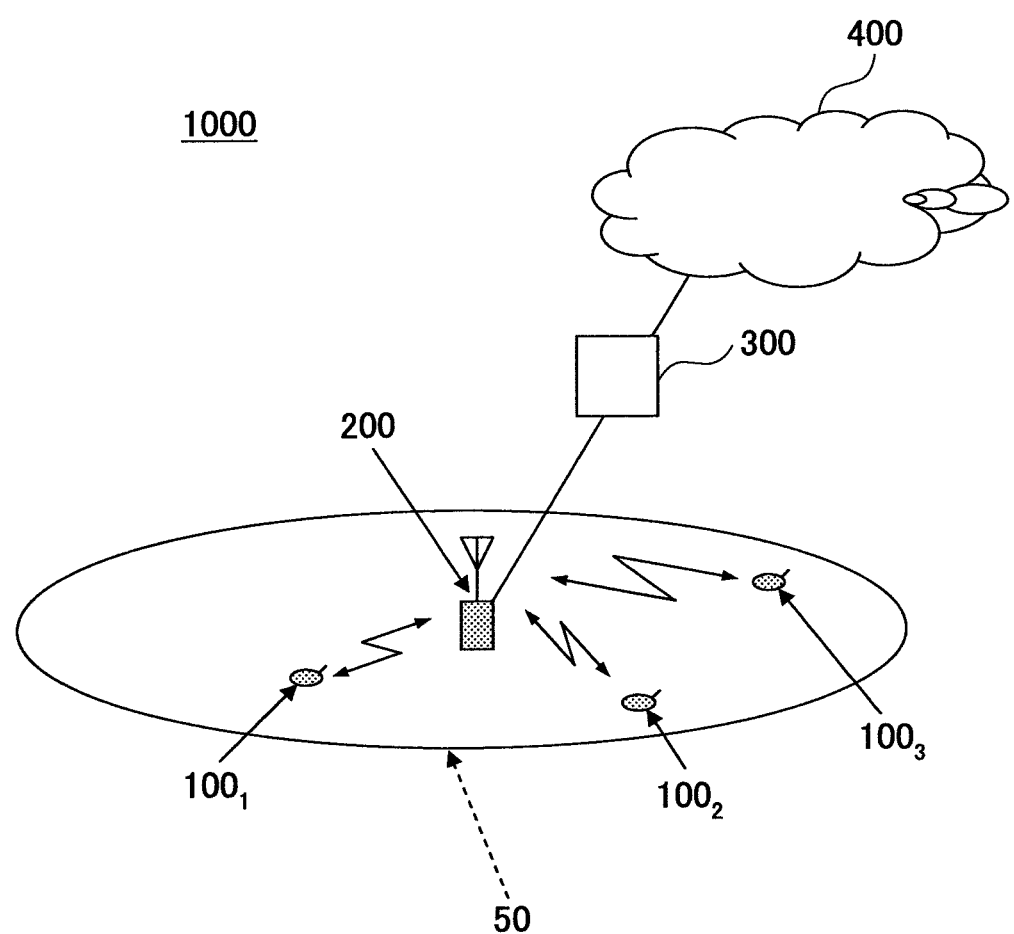
FIG. 4 is a block diagram illustrating a radio communication system according to one embodiment of the present invention.
Figure 7:
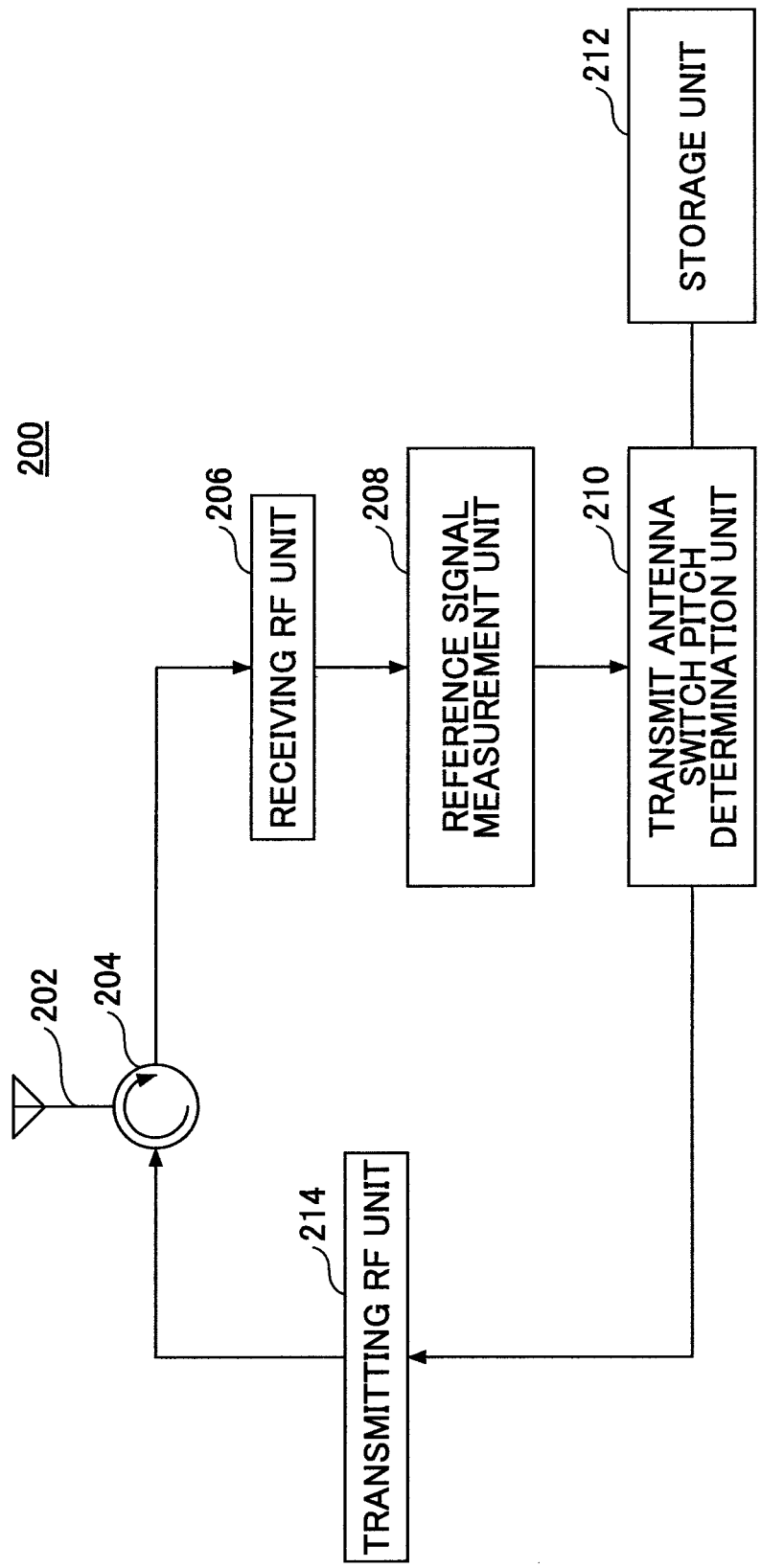
FIG. 7 is a partial block diagram illustrating a base station apparatus according to one embodiment of the present invention.
Figure 9:
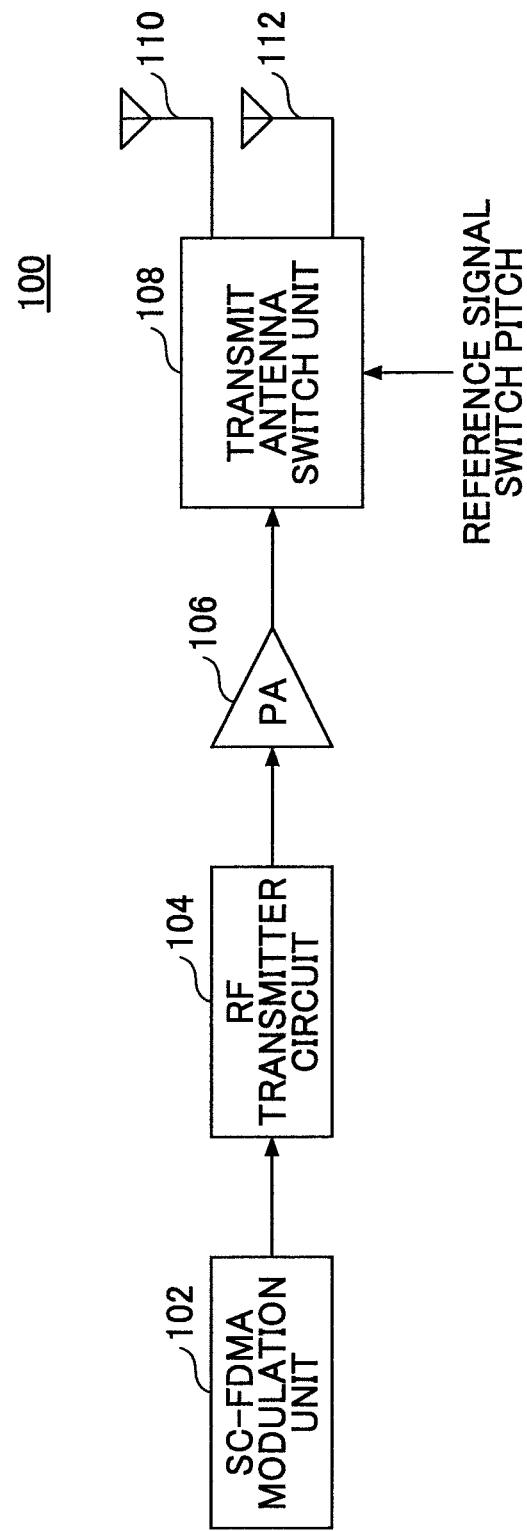
FIG. 9 is a partial block diagram illustrating a user apparatus according to one embodiment of the present invention.

A radio communication system, a base station apparatus and a user apparatus according to this embodiment have the same arrangements as those described in conjunction with FIGS. 4, 7 and 9 and are not repeatedly described.

In this embodiment, the base station apparatus 200 adjusts the reference signal transmit antenna switch pitch depending on position of the user apparatus $100_n$. For example, if it is determined that the user apparatus $100_n$ resides in the cell edge, the switch pitch is determined to be shorter. The user apparatus $100_n$ residing in the cell edge needs more transmit diversity effect. Thus, the switch pitch is adjusted to be shorter for the user apparatus $100_n$, resulting in sufficient diversity effect. On the other hand, if the user apparatus $100_n$ resides near the cell center, the switch pitch is adjusted to be longer for the user apparatus $100_n$ or the CL-ASTD is stopped.

In the base station apparatus 200 according to this embodiment, a receive strength (receive level) of reference signals is measured at the reference signal measurement unit 208 and supplied to the transmit antenna switch pitch determination unit 210.

The transmit antenna switch pitch determination unit 210 determines a transmit antenna switch pitch with reference to a table indicative of correspondence between receive strengths of the reference signals and transmit antenna switch pitches for sounding reference signals stored in the storage unit 212. The transmit antenna switch pitch determination unit 210 supplies the determined transmit antenna switch pitch to the transmitting RE unit 214. The transmitting RF unit 214 transmits the incoming transmit antenna switch pitch via the transmitting and receiving unit 204. For example, the transmitting RF unit 214 may use downlink channels, such as L1/L2 downlink control channels or dedicated channels, to transmit the transmit antenna switch pitch to the user apparatus 100$_n$.

Figures 11, 12:
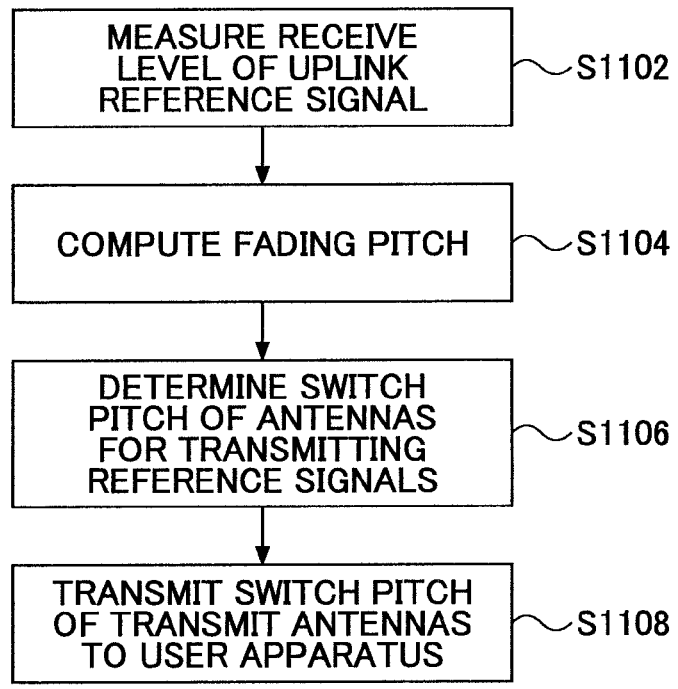
FIG. 11 is a flow diagram illustrating an exemplary operation of a base station apparatus according to one embodiment of the present invention.
FIG. 12 illustrates an exemplary table for specifying receive strengths of reference signals and switch pitches of antennas for transmitting sounding reference signals.

As illustrated in FIG. 12, the storage unit 212 stores the table indicative of the correspondence between the reference signal receive strengths and the transmit antenna switch pitches for sounding reference signals. Since it can be determined that the user apparatus 100$_n$ associated with a lower reference signal receive strength may reside near the cell edge, the table is generated such that the transmit antenna switch pitch can be shorter for that user apparatus 100$_n$. On the other hand, since it can be determined that the user apparatus 100$_n$ associated with a higher reference signal receive strength may reside near the cell center, the table is generated such that the transmit antenna switch pitch can be longer for that user apparatus 100$_n$ Also, when the reference signal receive strength becomes less than a predefined value, for example, a receive strength corresponding to a transmit antenna switch pitch disabling the base station apparatus 200 to follow the user apparatus 100$_n$ in accordance with the close loop control (or a receive strength corresponding to a transmit antenna switch pitch disabling tracking in accordance with the closed loop control), the reference signal transmit antenna switch pitch is made longer. Alternatively, the ASTD may be stopped.

Figure 13:
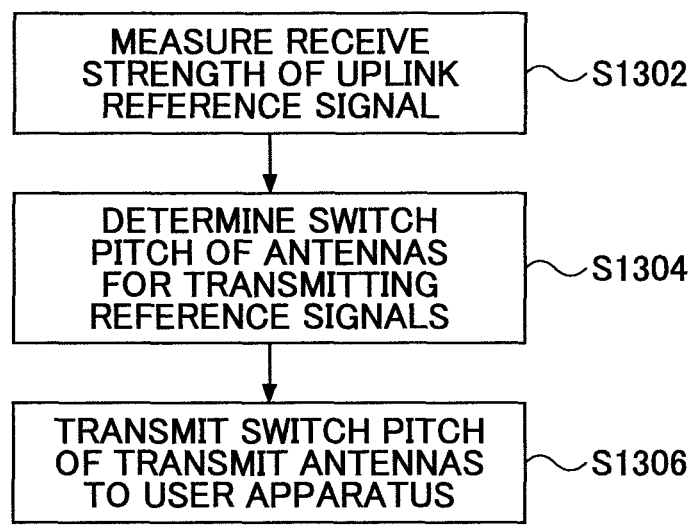
FIG. 13 is a flow diagram illustrating an exemplary operation of a base station apparatus according to one embodiment of the present invention.

Next, an exemplary operation of the base station apparatus 200 in the radio communication system 1000 according to this embodiment is described with reference to FIG. 13. At step S1302, the reference signal measurement unit 208 measures a receive strength (receive level) of reference signals transmitted from the user apparatus 100$_n$.

At step S1304, the transmit antenna switch pitch determination unit 210 determines a transmit antenna switch pitch for reference signals based on the measured receive strength of reference signals.

At step S1306, the transmit antenna switch pitch determination unit 210 transmits the determined reference signal transmit antenna switch pitch to the user apparatus 100$_n$ via the transmitting RF unit 214.

In this embodiment, the position of the user apparatus 100$_n$ within a cell is determined through uplink reference signals transmitted from the user apparatus 100$_n$. In other embodiments, the position of the user apparatus 100$_n$ within the cell may be determined through other measures such as measured receive strengths of shared data channels or command values of TPC (Transmit Power Control).

In the above-mentioned embodiments, the base station apparatus 200 determines migration speed of the user apparatus 100$_n$ based on uplink reference signals transmitted from the user apparatus 100$_n$ and adjusts the transmit antenna switch pitch (transmit pattern) for transmitting reference signals with reference to a predefined correspondence table based on the determined migration speed.

Also, the base station apparatus 200 determines the position of the user apparatus 100$_n$ within a cell based on measured receive strengths of uplink reference signals and/or shared data channels transmitted from the user apparatus 100$_n$ or TPC command values and adjusts the reference signal transmit antenna switch pitch (transmit pattern) with reference to a predefined correspondence table.

In other embodiments, the base station apparatus 200 may not determine the reference signal transmit antenna switch pitch. In other embodiments, the user apparatus 100$_n$ may determine the migration speed and/or the position within a cell of the user apparatus 100$_n$ and adjust the reference signal transmit antenna switch pitch (transmit pattern) with reference to a predefined correspondence table. For example, the user apparatus 100$_n$ may determine the migration speed based on a fading fluctuation speed estimated from downlink reference signals, the migration speed estimated by GPS (Global Positioning System) in the user apparatus 100$_n$ or others. Also, the user apparatus 100$_n$ may determine the position of the user apparatus 100$_n$ within a cell based on path loss from the base station apparatus 200 connected to the user apparatus 100$_n$, a measured ratio of the path loss of the connected base station apparatus 200 to path loss of an adjacent or neighboring base station apparatus to the base station apparatus 200, matching between geographic information obtained through the GPS and possessed position information of the base station apparatus 200, the TPC command values or others.

In this manner, in the case where the user apparatus 100$_n$ determines transmit time intervals, the determined results are transmitted to the base station apparatus 200 in uplink channels or uplink dedicated control channels.

The present invention has been described in conjunction with the above embodiments, but it should be understood that the present invention is not limited to statements and drawings being a part of the disclosure. Various alternative implementations, embodiments and operational techniques will be apparent to those skilled in the art in light of the disclosure.

Thus, it will be appreciated that implementations other that the above-mentioned embodiments are within the scope of the present invention. The scope of the present invention should be defined by only the appended claims.

For convenience of explanation, the present invention has been described in several separate embodiments, but the separation is not essential to the present invention and two of the embodiments may be used together if necessary. Some specific numerical values have been used to prompt understanding of the present invention, but unless specifically stated otherwise, these numerical values are illustratively used and any other appropriate values may be used.

The present invention has been described with reference to specific embodiments, but the embodiments are illustrative and variations, modifications, alterations and substitutions could be conceived by those skilled in the art. For convenience of explanation, apparatuses according to embodiments of the present invention have been described by means of functional block diagrams, but the apparatuses may be implemented in hardware, software or combinations thereof. The present invention is not limited to the above embodiment and various variations, modifications, alterations and substitutions can be included in the present invention without deviation from the spirit of the present invention.

This international patent application is based on Japanese Priority Application No. 2007-034133 filed on Feb. 14, 2007, the entire contents of which are hereby incorporated by reference.

The invention claimed is:

1. A base station apparatus in a radio communication system where transmit diversity is applied in uplinks, wherein a user apparatus including multiple antennas switches among the antennas in accordance with an antenna switch pitch transmitted from the base station apparatus and transmits a sounding reference signal in an uplink, the base station apparatus comprising:
- a reference signal measurement unit configured to measure a receive level of the sounding reference signal;
- a switch pitch determination unit configured to determine the antenna switch pitch of transmitting the sounding reference signal based on the receive level measured by the reference signal measurement unit; and
- a transmitting unit configured to transmit the antenna switch pitch determined by the switch pitch determination unit,
- wherein the antennas are consecutively and alternately selected for transmission of the sounding reference signal on the variable antenna switch pitch indicated from the base station apparatus.

2. The base station apparatus as claimed in claim 1, further comprising:
- a table indicating correspondence between receive levels of the sounding reference signal and the antenna switch pitches of transmitting the sounding reference signal,
- wherein the switch pitch determination unit is configured to determine the antenna switch pitch of transmitting the sounding reference signal based on the table.

3. The base station apparatus as claimed in claim 2, wherein a lower receive level corresponds to a shorter antenna switch frequency of transmitting the sounding reference signal in the table.

4. The base station apparatus as claimed in claim 2, wherein when the receive level becomes less than a predefined threshold, the switch pitch determination unit is configured to make the antenna switch pitch of transmitting the sounding reference signal longer or stop antenna selection transmit diversity.

5. The base station apparatus as claimed in claim 1, further comprising:
- a fading pitch measurement unit configured to determine a fading pitch based on the receive level of the sounding reference signal; and
- a table indicating correspondence between the fading pitches and the antenna switch pitches of transmitting the sounding reference signal,
- wherein the switch pitch determination unit is configured to determine the antenna switch pitch of transmitting the sounding reference signal based on the table.

6. The base station apparatus as claimed in claim 5, wherein a shorter fading pitch corresponds to a shorter antenna switch pitch of transmitting the sounding reference signal in the table.

7. The base station apparatus as claimed in claim 5, wherein when the fading pitch becomes less than a predefined threshold, the switch pitch determination unit is configured to make the antenna switch pitch of transmitting the sounding reference signal longer or stop antenna selection transmit diversity.

8. A user apparatus in a radio communication system where transmit diversity is applied in uplinks, wherein an antenna switch pitch of transmitting a sounding reference signal is determined in a base station apparatus based on a receive level of the sounding reference signal transmitted in an uplink and is transmitted to the user apparatus, the user apparatus comprising:
- multiple antennas; and
- an antenna switch unit configured to switch among the antennas to transmit the sounding reference signal based on the antenna switch pitch,
- wherein the antennas are consecutively and alternately selected for transmission of the sounding reference signal on the variable antenna switch pitch indicated from the base station apparatus.

9. A communication control method in a radio communication system where transmit diversity is applied in an uplink, the method comprising:
- a user apparatus switching among multiple antennas in accordance with an antenna switch pitch transmitted from a base station apparatus and transmitting a sounding reference signal;
- the base station apparatus measuring a receive level of the sounding reference signal;
- the base station apparatus determining an antenna switch pitch of transmitting the sounding reference signal based on the measured receive level; and
- the base station apparatus transmitting the determined antenna switch pitch to the user apparatus,
- wherein the antennas are consecutively and alternately selected for transmission of the sounding reference signal on the variable antenna switch pitch indicated from the base station apparatus.

* * * * *